United States Patent [19]
Waterman et al.

[11] Patent Number: 5,235,767
[45] Date of Patent: Aug. 17, 1993

[54] SHOPPING CART ADVERTISING DISPLAY STRUCTURE

[75] Inventors: Dewey J. Waterman; Gregory W. Ferris, both of Battle Creek, Mich.

[73] Assignee: United Steel & Wire Company, Battle Creek, Mich.

[21] Appl. No.: 888,406

[22] Filed: May 21, 1992

Related U.S. Application Data

[63] Continuation-in-part of Ser. No. 624,131, Dec. 7, 1990, abandoned.

[51] Int. Cl.⁵ .............................................. G09F 3/00
[52] U.S. Cl. .............................................. 40/308; 40/152
[58] Field of Search ................. 40/308, 152, 124.1, 40/611, 649, 574; 16/260

[56] References Cited

U.S. PATENT DOCUMENTS

| | | | |
|---|---|---|---|
| 470,291 | 3/1892 | Dowling | 16/260 |
| 1,432,404 | 10/1922 | MacOrquodale | 40/124.1 |
| 3,924,294 | 12/1975 | Thaler et al. | 16/260 |
| 4,467,543 | 8/1984 | Townsend | 40/152 |
| 4,922,639 | 5/1990 | Rehrig | 40/308 |

FOREIGN PATENT DOCUMENTS

| | | | |
|---|---|---|---|
| 3513577 | 10/1986 | Fed. Rep. of Germany | 16/260 |
| 2625587 | 7/1989 | France | 40/308 |

*Primary Examiner*—Kenneth J. Dorner
*Assistant Examiner*—Milton Nelson, Jr.
*Attorney, Agent, or Firm*—Flynn, Thiel, Boutell & Tanis

[57] ABSTRACT

An advertisement display unit for use with the sidewall of a shopping cart basket, which display unit includes an enlarged platelike base member and a ring-shaped cover member hingedly coupled to the base member and swingable between an open position and a closed position wherein it overlies the base member for clamping a sheetlike advertisement therebetween. The cover and base members define a separable hinge structure which provides a desirable hinge connection which enables the cover member to swing to an open position and be supportingly maintained in the open position, but which also enables the cover member to be vertically lifted upwardly when in the open position so as to slidably separate the hinge to totally disconnect the cover member from the base member.

17 Claims, 4 Drawing Sheets

U.S. Patent   Aug. 17, 1993   Sheet 1 of 4   5,235,767
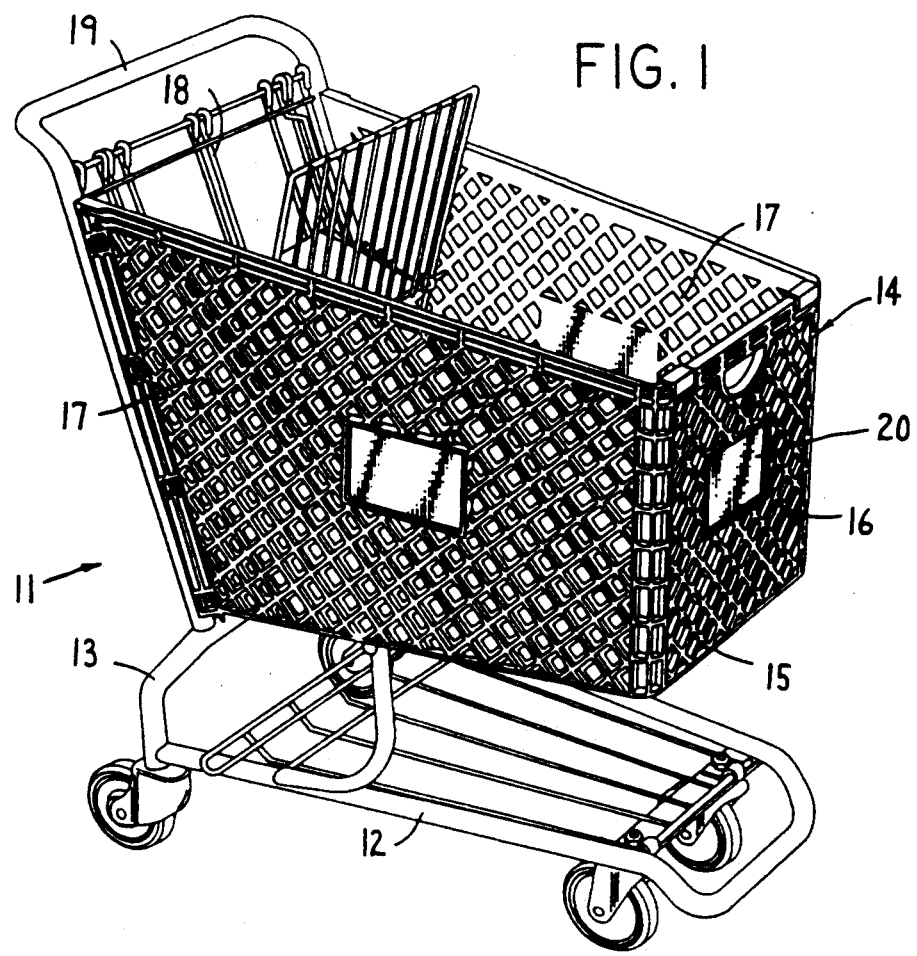
FIG. 1
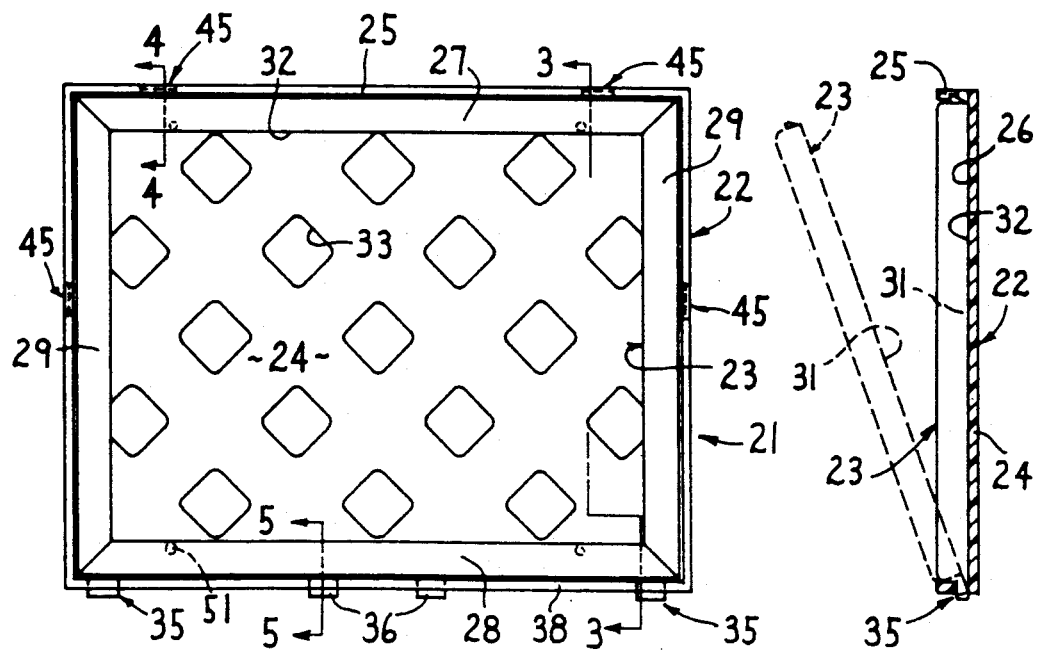
FIG. 2
FIG. 3

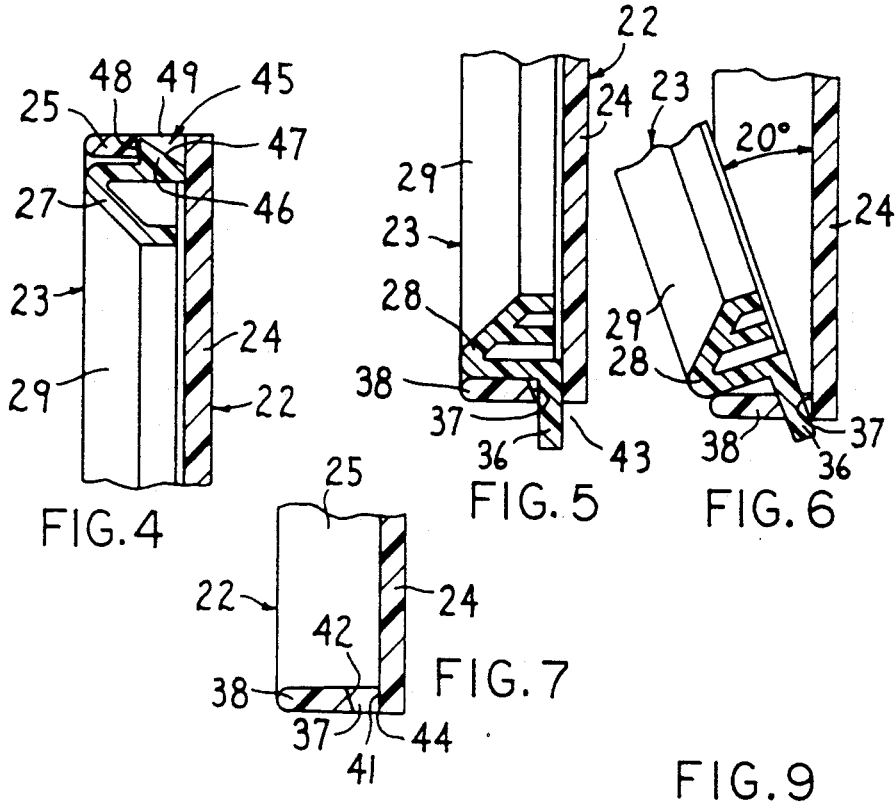
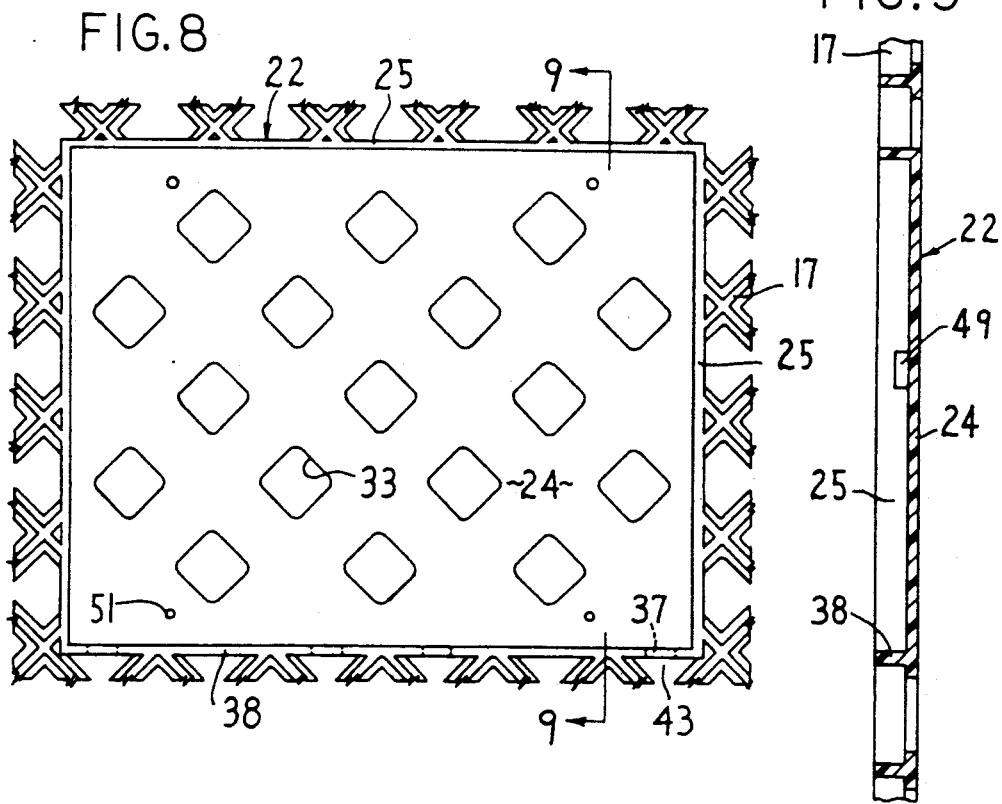

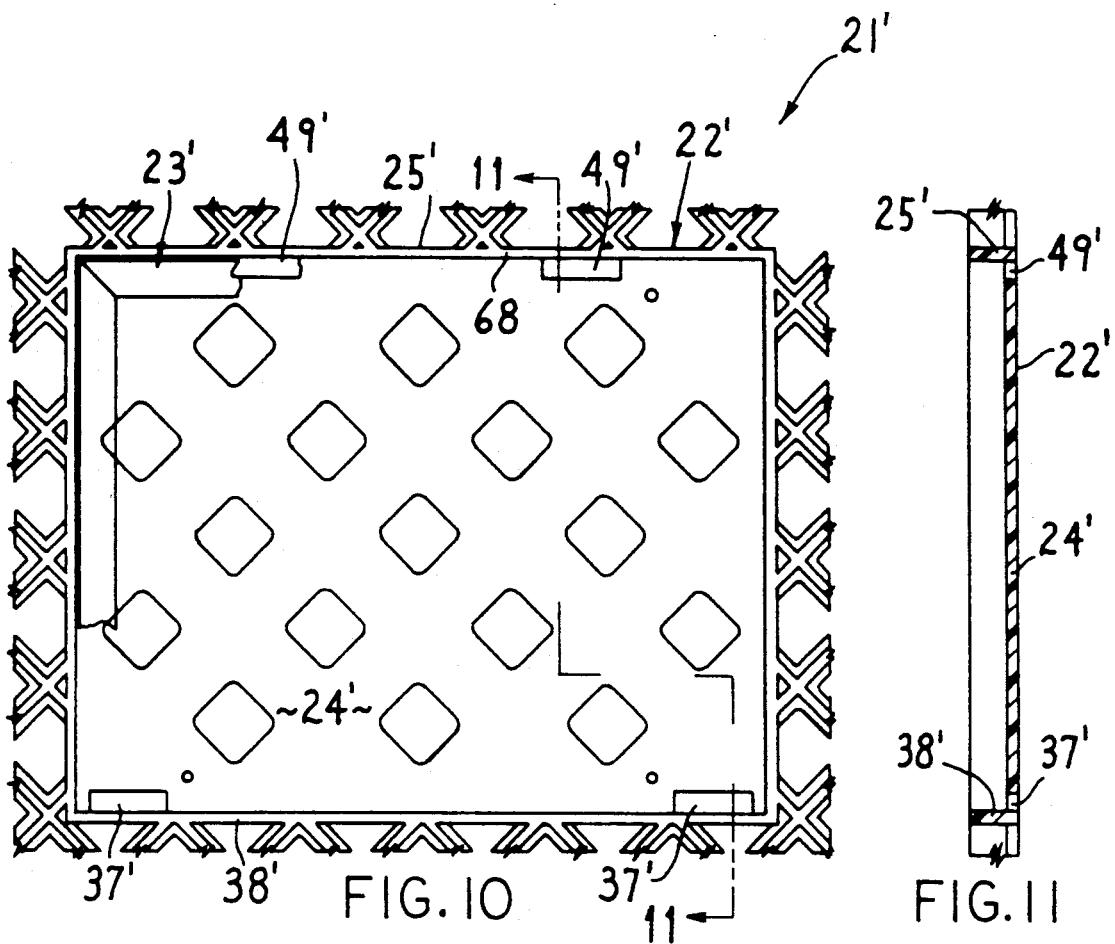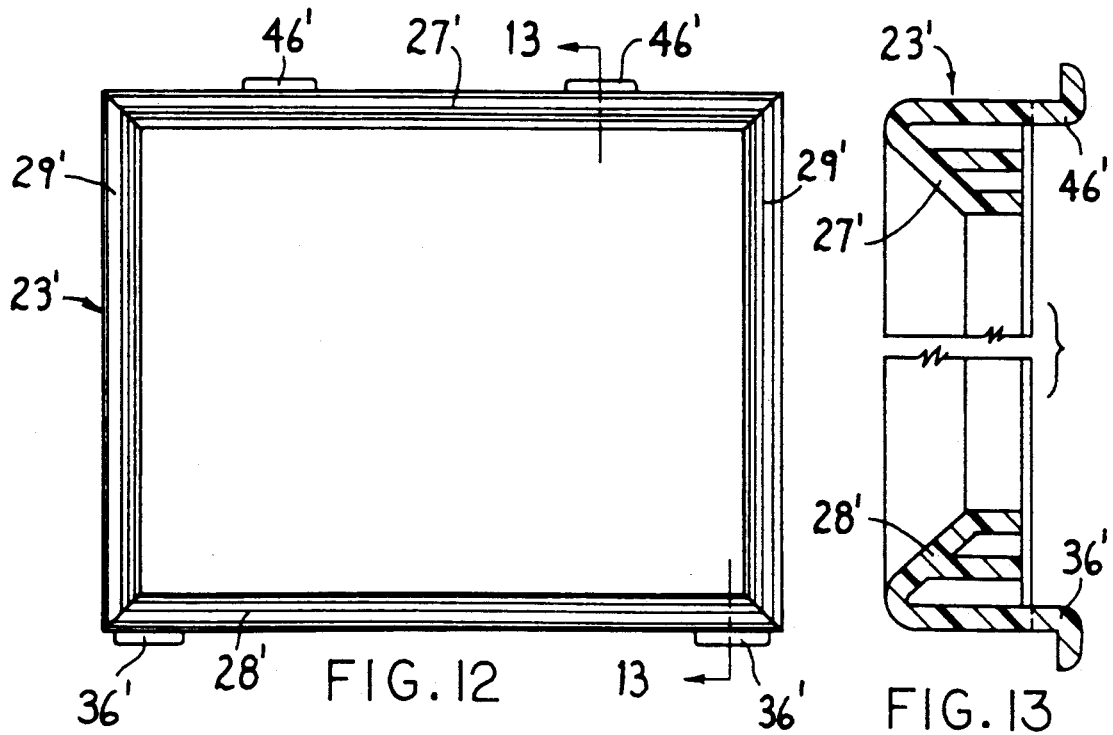

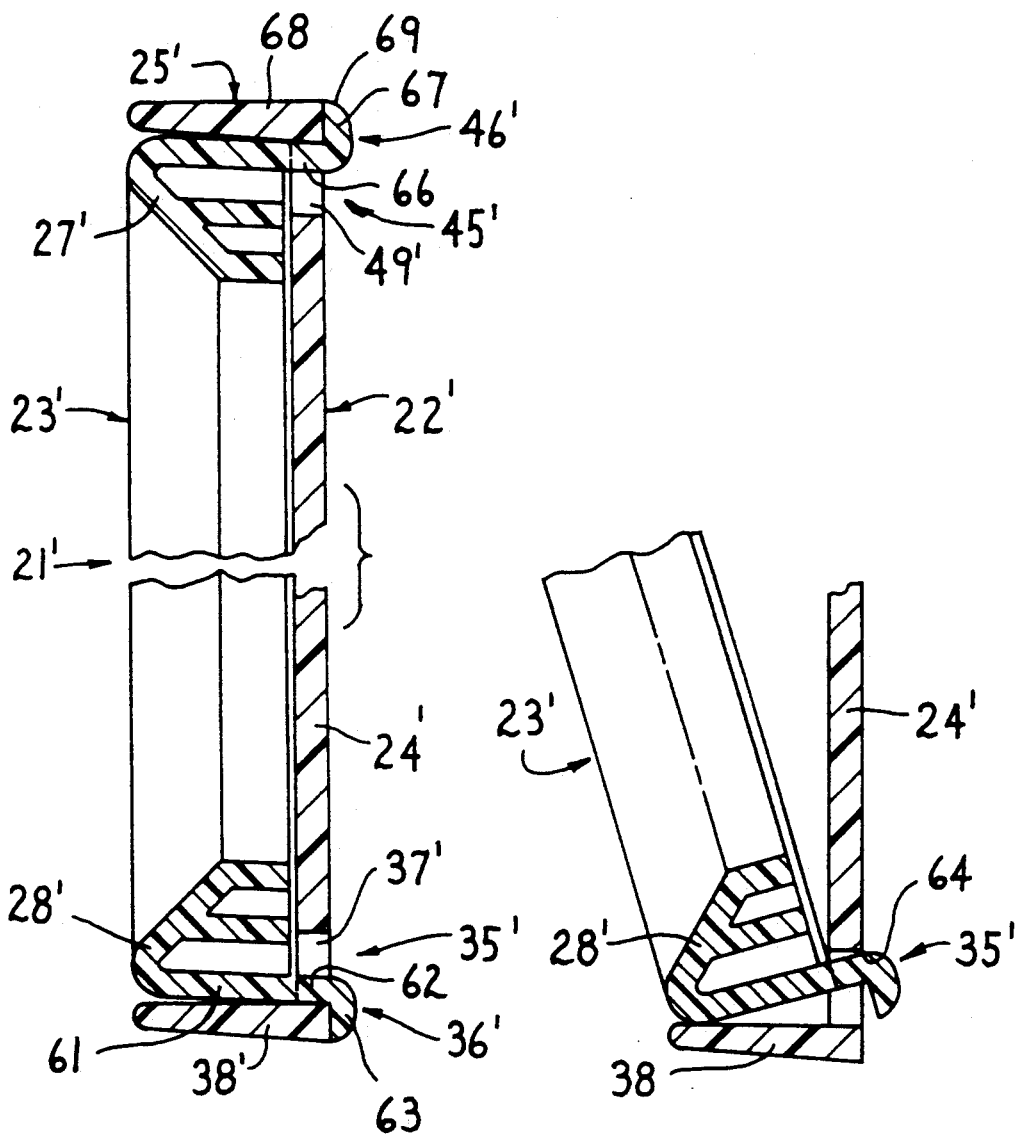

SHOPPING CART ADVERTISING DISPLAY STRUCTURE

CROSS REFERENCE TO RELATED APPLICATION

This application is a continuation-in-part of copending application Ser. No. 07/624,131, filed on Dec. 7, 1990, now abandoned.

FIELD OF THE INVENTION

This invention relates to an improved advertising display structure specifically for use on a shopping cart.

BACKGROUND OF THE INVENTION

It is conventional in shopping carts to provide advertising display units on the basket sidewalls so as to permit merchants to advertise or promote various items, such as for either advertising in-store specials or nationally promoted items. The advertising units are conventionally mounted on outer sides of the side and front walls of the basket, and also often on the inner side of the basket front wall so as to provide significant exposure to customers of the items being promoted. The advertising unit conventionally comprises a platelike base member having a surrounding rectangular rim, and a rectangular ring-shaped cover member which releasably overlies the base member to clampingly hold a disposable sheetlike advertisement therebetween. The advertisement is conventionally printed on paperboard or heavy paper so as to be readily positionable within the advertising unit, and readily removed and disposed of when desired.

One of the known and more conventionally utilized advertising units employs base and cover members which are molded of a plastics material, with the base and cover members being permanently hingedly joined together along one edge by an integrally molded plastic hinge. Releasable latch structures cooperate between other sides of the cover and opposed sides of the base member rim. With this arrangement, the cover can be manually unlatched from the base so as to swing outwardly to permit access between the cover and base for insertion and removal of advertisements. While this advertisement unit is desirable in terms of facilitating opening and closing of the cover so as to permit insertion and removal of advertisements, nevertheless it has been observed that the integral plastic hinge is subject to failure after a minimum number of opening/closing cycles, and then requires removal of the advertising unit and replacement thereof since repair is difficult and impractical.

In another known advertising unit as utilized on shopping carts, an attempt has been made to avoid the problems associated with units having integrally molded hinges by making the cover and base members totally separate, whereby the unit is totally free of hinges. In this latter unit, the cover and base are each molded of plastic material, but are not hinged together. Rather, releasable latches are provided for cooperation between each side of the cover and each side of the base rim. Hence, the cover in its entirety can be totally removed from the base. This, however, can also be disadvantageous since if total removal of the cover is required each time an advertisement is changed, then this requires the attendant to manipulate both the cover and the advertisement while at the same time positioning them relative to the cart. Needless to say, this display unit is more difficult to manually manipulate with respect to insertion and removal of advertisements. Further, this cover is believed more difficult to remove from the rim. In an attempt to solve this problem, this known advertising display unit provides a narrow slot along one side thereof which is provided to assist in permitting insertion of the advertisement without removing the cover. However, while insertion of the advertisement through the slot is possible, nevertheless this has proven difficult in some instances, particularly if the advertisement is of heavy, stiff or thick cardboard. Further, removal of the advertisement through the slot is extremely difficult and time consuming, particularly if it is of a heavy material, and thus total removal of the cover in such instance is required.

Thus, it is an object of this invention to provide an improved advertising display unit particularly for use on shopping cart baskets, which unit is believed to represent a significant improvement and in fact overcomes many of the disadvantages associated with known units, as explained above.

In the improved advertising display unit of the present invention, the base and cover members are joined by a readily separable hinge which permits the cover member to be readily swingably moved between open and closed positions and additionally permits the cover member to remain in a angled opened position wherein it is stably supported by the base member so that the attendant has both hands free to facilitate removal and insertion of an advertisement, but wherein the cover member can also be readily totally separated from the base member merely by lifting the cover member upwardly relative to the base member when in the open position to effect separation of the hinge structure. This facilitates both manufacture, assembly and maintenance of the display unit, and also provides for efficient and convenient utilization thereof.

Other objects and purposes of the invention will be apparent to persons familiar with structure of this general type upon reading the following specification and inspecting the accompanying drawings.

BRIEF DESCRIPTION OF THE DRAWINGS

FIG. 1 is a perspective view of a conventional shopping cart.

FIG. 2 is a front elevational view of an advertising display unit according to the present invention.

FIG. 3 is a sectional view taken substantially along line 3—3 of FIG. 2.

FIG. 4 is an enlarged fragmentary sectional view taken substantially along line 4—4 in FIG. 2.

FIG. 5 is an enlarged fragmentary sectional view taken substantially along line 5—5 in FIG. 2.

FIG. 6 is a view similar to FIG. 5 but showing the cover in an open position.

FIG. 7 is an enlarged fragmentary sectional view similar to FIG. 6 but with the cover totally removed or separated from the base member.

FIG. 8 illustrates a variation wherein the base member of the advertising display unit is molded directly into one of the basket walls.

FIG. 9 is a sectional view taken substantially along line 9—9 in FIG. 8.

FIG. 10 is a front elevational view of the base member as molded into one of the basket walls according to a modification of the advertising display unit of the present invention.

FIG. 11 is a sectional view taken along line 11—11 in FIG. 10.

FIG. 12 is a front elevational view of the front cover or removable frame which is adapted for cooperation with the base member of FIG. 10 according to the modified advertising display unit.

FIG. 13 is a sectional view along line 13—13 in FIG. 12.

FIG. 14 is a fragmentary sectional elevational view through the lower hinge and top latch which couple the cover to the base member according to the modified advertising display unit of FIGS. 10-13, with the cover being shown in its closed position.

FIG. 15 is a fragmentary sectional view similar to FIG. 14 but showing the cover in its open position but still hingedly coupled to the base member.

Certain terminology will be used in the following description for convenience in reference only, and will not be limiting. For example, the words "upwardly", "downwardly", "rightwardly" and "leftwardly" will refer to directions in the drawings to which reference is made. These same words will also be used to refer to the usual directions as associated with the advertising display unit, particularly when mounted on the cart basket wall. The words "inwardly" and "outwardly" will refer to directions toward and away from, respectively, the geometric center of the display unit and designated parts thereof. Said terminology will include the words specifically mentioned, derivatives thereof, and words of similar import.

DETAILED DESCRIPTION

FIG. 1 illustrates a known shopping cart 11 having a wheeled base 12 to which is fixedly secured an upright structure 13, the latter in turn supporting the underside of an upwardly opening basket 14. The basket 14 includes a bottom wall 15 and a plurality of sidewalls projecting upwardly therefrom, including a front wall 16, opposed sidewalls 17, and a rear wall 18. A handle 19 is fixedly associated with and extends transversely across the rearward end of the basket. The basket 15 in the illustrated embodiment is provided with walls 16 and 17 which are molded of plastics material, although it will be recognized that such baskets also are conventionally formed of a meshlike construction formed by transversely intersecting welded wire rods. In such baskets, particularly baskets having plastic sidewalls, it is conventional to provide the basket with a plate arrangement 20 integrally molded into the wall of the basket, which plate arrangement permits attachment thereto of a suitable display such as a supermarket logo.

Referring now to FIGS. 2-7, there is illustrated an improved advertising display unit 21 according to the present invention. This unit is formed by two primary components, namely a base member 22 and a cover member 23, each preferably being molded in one piece of a plastics material.

The base member 22 is formed primarily by a flat back plate 24 having a rectangular ringlike flange or rim 25 fixed to the edge of the back plate and projecting generally perpendicularly outwardly from one side thereof. This ringlike flange 25 surrounds the periphery of the back plate 24 and cooperates therewith so as to define therein a shallow recess 26.

The cover member 23 has a rectangular ringlike construction which resembles a picture frame and includes generally horizontally extending top and bottom elements 27 and 28, respectively, the latter being rigidly joined together by generally parallel side elements 29 which extend perpendicularly between and rigidly joined free ends of the top and bottom elements.

The cover member 23 defines thereon a rear surface 31 which extends along a rearward side of each of the elements 27-29, which rear surface 31 is adapted to substantially directly overlie the front surface 32 of the back plate 24.

The cover elements 27-29 are all rather narrow in sideward extent, whereby the cover member 23 defines therethrough a large rectangular opening 32 for permitting visibility of an advertisement which is held between the cover member and the back plate. The back plate 24, in the illustrated embodiment, also has a plurality of openings 33 formed therein. These openings 33 permit minimal use of plastic material.

The base and cover members 22 and 23 are coupled together by a separable hinge means 35 which cooperate between the lower horizontal cover element 28 and the lower horizontally extending element 38 associated with the rectangular ringlike flange 25. The separate hinge means 35 includes a plurality of platelike hinge tabs 36 which are fixed to and project generally vertically downwardly from the bottom horizontal cover element 28, which hinge tabs are disposed in spaced relationship along the bottom element. Each hinge tab 36 is adapted to project downwardly through a hinge recess 37 which constitutes a narrow slot which projects vertically downwardly through the flange bottom element 38. The hinge recess or slot 37 has a rear side 41 which is closely adjacent and, in the illustrated embodiment, substantially coplanar with the front wall 32 of the back plate 24. The hinge slot 37 has a front side 42 which, as illustrated by FIG. 7, is sloped forwardly as it projects upwardly through the bottom flange element 38, whereby the opposed walls 41 and 42 hence are of a converging relationship as they project downwardly. The width of the hinge slot 37 at the bottom thereof (that is, where sides 41 and 42 intersect the lower surface of the bottom element 38) is only slightly greater than the thickness of the hinge tab 36, whereas the width of the hinge slot 37 at the upper end thereof substantially exceeds the thickness of the hinge tab 36.

The hinge tab 36 has a downwardly depending length (that is, a downwardly cantilevered dimension) which is significantly greater than the vertical length of the hinge slot 37, which vertical length of slot 37 corresponds to the vertical thickness of the material defining the bottom element 38. In fact, the hinge tab 36 preferably has a downward vertically cantilevered extent or dimension which is at least two times greater than the vertical depth of the hinge slot 37. In addition, an open region 43 is disposed directly below the lower edge of the back plate 24, which region 43 is also disposed directly rearwardly of the downwardly projecting hinge tab 36 when the cover member is in the closed position illustrated by FIG. 5. This open region 43 is provide so as to prevent interference with the rearward swinging displacement of the downwardly projecting hinge tab 36 when the cover is moved into the open position illustrated by FIG. 6.

In the illustrated embodiment, the front sidewall 42 of the hinge slot 37 slopes forwardly at an angle of about 20° relative to the vertical as the sidewall projects upwardly. This enables the cover member 22 to be swung outwardly into open position wherein it projects at an angle of about 20° relative to the base member, as illustrated by FIG. 6. When in this open position, however, the cover is basically self supporting and remains in this angled open position since the front of the hinge tab 36 bears against the front sloped sidewall 42 of the hinge slot, and at the same time the rear surface of the tab 36 bears against the corner or shoulder 44 defined at the lower edge of the rear side 41.

The advertising unit 21 also includes a plurality of releasable latches 45 which cooperate between the base and cover members for securely but releasably holding the cover 23 in the closed position. As illustrated by FIG. 2, a pair of latches 45 are disposed in spaced relationship along the upper edge of the display unit, and a further latch 45 is also preferably provided for cooperation with each side of the display unit.

Each latch 45 includes a latching projection 46 which is fixedly and integrally formed on one of the cover elements such as the horizontal top element 27 and projects upwardly therefrom as illustrated in FIG. 4. This latching projection 46 has a front upwardly projecting shoulder or surface 48 which joins to a top surface 49 which is tapered or sloped downwardly as it projects rearwardly, whereby the latching projection 46 functions like a latching cam. This latching projection 46 is adapted to project into a slot or recess 49 which is formed in and projects through the top horizontal element 25 in close proximity to the back plate 24.

The latch 45 enables the cover member 23 to be swung inwardly toward a closed position, and the tapered cam surface 47 engages the front edge of the top flange 25 and resiliently deflects the cover member until it moves inwardly to its fully closed position, whereupon the latching projection 46 resiliently snaps into the latching recess 49. When in this latched position, the front shoulder or surface 48 substantially directly abuts one side of the latching recess and prevents the cover member from opening.

When opening of the cover member is desired, the cover member 23 is resiliently gripped preferably adjacent the upper element thereof and sufficiently resiliently deformed so as to release the latches, followed by outward swinging of the cover member into the open position illustrated by FIG. 6.

With the cover in the open position illustrated by FIG. 6, an attendant can readily reach inwardly between the cover and base and remove an existing sheetlike advertisement, and thereafter insert a new sheetlike advertisement behind the cover in overlying relationship to the front surface 32 of the base wall. During this manipulation of the advertisements, the attendant need not maintain either hand in engagement with the cover since the cover will remain stably and stationarily supported in its opened position due to the abutting engagement of the tab 36 with opposite sides of the slot 37 as illustrated by FIG. 6. The cover can then be easily manually swung back into its closed position so as to latchingly engage the base member, with the advertisement being securely held around the periphery thereof due to its being engaged between the surface 32 on the base wall and the rear surface 31 of the cover.

On the other hand, if desired or necessary, the cover 23 can be readily separated from the base member merely by swinging the cover into the open position illustrated by FIG. 6, and then lifting the cover upwardly so as to withdraw the latching tabs 36 from the latching recesses 37.

The base wall 15 may be provided with a series of small openings 51 therethrough for accommodating fasteners such as screws or bolts to enable attachment of the unit to the sidewall of a cart when the unit is constructed independently in accordance with the embodiment shown in FIGS. 2 and 3.

On the other hand, as a variation of the invention, the display unit can be integrated into the basket sidewall. As shown in FIG. 8, the base member 22 can be incorporated into the thickness of the sidewall 17 (or front wall 16) and molded integrally therewith.

Referring now to FIGS. 10-15, there is illustrated a modification of the an advertising display unit according to the present invention. For convenience in description and illustration, corresponding parts of the modified display unit of FIGS. 10-15 are identified by the same reference numeral utilized in conjunction with FIGS. 2-9 above except for the addition of a prime (') thereto.

This modified advertising display unit 21' preferably has the base member 22' thereof molded directly into the sidewall 17' of the shopping cart basket, similar to the variation of FIG. 8 described above, whereby the ringlike flange 25' of the base member 22' surrounds the back plate 24' so that the back plate is substantially flush with the inner surface of the basket sidewall and the rim 25' projects outwardly through substantially the thickness of the basket sidewall. The rectangular ring-shape frame or cover member 23' is releasably positioned within the shallow recess 26' defined by the base member 22' so as to confine a removable advertising panel or sheet therebetween. The base and cover members 22' and 23' are coupled together, adjacent the lower corners thereof, by a pair of separable hinge means 35', each of which includes a hinge tab 36' fixed and integrally joined to the bottom horizontal cover element 28' and cooperating with a hinge recess 37' which projects horizontally through the back plate 24' directly adjacent the upper inner surface of the flange bottom element 38'.

The hinge tab 36' is of a generally L-shaped configuration which projects in a cantilevered fashion initially rearwardly and then downwardly from the flange bottom element 38'. More specifically, the L-shaped hinge tab 36' includes a horizontal leg part 62 which is integrally molded with the bottom wall 61 of the element 38' and projects rearwardly in coplanar relationship from the bottom wall 61. This rearwardly projecting leg part 62, at its rearward end, in turn is integrally joined to a downwardly projecting leg part 63 which terminates in a free lower end. The leg part 62 has a length which exceeds the thickness of the back plate 24', which thickness also corresponds to the length of the hinge recess 37', so that the hinge tab 36' can project entirely through the recess 37' whereby the leg part 63 projects downwardly directly behind the rear wall of the flange bottom element 38'.

The hinge recess 37' is formed as an elongate slot which projects through the back plate 24' directly above the flange bottom element 38', and this slot 37' has a height which only slightly exceeds the height of the tab 36' as measured along the rear leg part 63' so that the latter can hence be moved horizontally through the slot 37' to effect engagement or disengagement of the cover and base members. The height of the slot 37', which height significantly exceeds the thickness of the leg part 62 as illustrated by FIG. 4, enables the cover member 23' to be swung outwardly into an open position wherein its projects at an angle of about 20° relative to the base member 22', as illustrated by FIG. 15. When the cover member is moved from the closed position of FIG. 14 into the open position of FIG. 15, the lower horizontal cover element 28' effectively rocks or fulcrums about the lower front corner thereof so that the hinge tab 36' is vertically lifted upwardly, as permitted by the height of the slot 37', until the upper surface of the hinge tab 36' effectively abuts the rear corner 64 of the top wall of the slot, thereby resisting further swinging opening movement of the cover member. Hence, when in this FIG. 15 position, the cover member 23' is self-supporting and remains in this angled open position due to the manner in which the hinge tabs 36' bear against the rear top corners of the respective hinge slots 37'.

The modified advertising display unit 21' also includes a plurality of releasable latches 45' which cooperate between the base and cover members for securely but releasably holding the cover member 23' in the closed position. As illustrated by FIGS. 10-14, a pair of latches 45' are provided solely along the upper edge of the display unit, which latches are preferably spaced inwardly a significant distance from the upper corners as explained hereinafter.

Each latch 45' includes a cantilevered latching projection 46' which is fixedly and integrally formed on and projects rearwardly from the horizontal top element 27'. This latching projection 46' is of an L-shaped cross section defined by a horizontally rearwardly extending leg part 66 which at its rearward end joins to an upwardly projecting leg part 67 which terminates in a free upper end. This L-shaped latching projection 46' is identical to the hinge projection 36' except that the rear vertical legs 67 and 63 project in opposite vertical directions, namely upwardly and downwardly respectively. The latching projection 46' is adapted to project into and through a slot or recess 49' which is formed in and projects horizontally through the back plate 24'. This slot 49' projects through the back plate 24' directly adjacent the lower surface of the upper horizontally extending flange element 68 associated with the ringlike flange 25'. This slot 49' is dimensionally substantially identical to the hinge slot 37' in that it has a vertical height which only slightly exceeds the height of the rear leg 67 so that the latter can be horizontally moved into and through the slot so as to permit the upper edge of the cover member 23' to be suitably latched to or released from the base member 22'. The outer free end of the rear leg 67 has a rounded cam surface 69 formed thereon which, when the cover is swung inwardly toward a closed position, engages the top flange 68 and resiliently deflects the top cover member 27' downwardly until the latch member 46' moves into and through the slot 49', at which time the resiliency of the cover element 27' resiliently snaps the latch tab 46' upwardly so that the rear leg 67 is locked behind the rear surface of the top rim flange 68.

When opening of the cover member 23' is desired, then the upper element 27' is manually gripped and resiliency deflected downwardly, or in the alternative a small tool can be inserted between the top rim flange 68 and the top cover element 27' to deflect the latter downwardly, thereby moving the latching tabs 46' downwardly from behind the top rim flange. The top edge of the cover can then be moved outwardly so as to withdraw the latching tabs 46' through the slots 49', thereby enabling the cover to be swung into an open position illustrated by FIG. 15 wherein the cover is then self-supported due to the supportive engagement provided by the hinge 35'. The latches 45', due to their being positioned inwardly a significant distance from the upper corners, enables the cover member to snugly fit within the recess of the base member but at the same time the top cover element 27' possesses sufficient resiliency so as to enable this element 27' to be resiliency bowed downwardly relative to the corners to enable release of the latches.

With the cover in the open position illustrated by FIG. 15, then a person can readily remove an existing sheetlike advertisement, and thereafter insert a new sheetlike advertisement behind the cover, in the same manner as described above relative to FIGS. 2-9. The cover can then be easily manually swung back into its closed position whereby the latches will automatically resiliently snap into engagement to hold the cover in the closed position.

If desired or necessary, the cover member 23' can be readily separated from the base member 22' merely by swinging the cover toward the open position illustrated by FIG. 15, and then manually moving the cover member, in its entirety, horizontally away from the base member (leftwardly in FIG. 15) so as to entirely withdraw the hinge tabs 36' from engagement with the slots 37'.

This modified advertising display unit 21' simplifies molding of the overall unit since all of the openings, including the hinge and latching slots, are all provided in the base wall. This unit also provides for more positive latching of the cover member in the closed position so as to more readily prevent accidental release or opening of the unit, while still retaining the self-supporting feature for the cover when in the open position so as to facilitate the removal and insertion of advertising sheets.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shopping cart comprising a wheeled base having an upwardly opening basket mounted thereon wherein a sidewall of the basket is made of plastic and has a base member of an advertisement display unit integrally molded therewith, said advertisement display unit also having a cover member releasably receivable in said base member, the improvement which comprises: said base member is comprised of a substantially planar base wall having a continuous flange extending at a right angle thereto, said flange defining the perimeter of a rectangular, shallow recess capable of receiving a removable advertising sheet, a portion of said flange defining a bottom edge of said recess having a plurality of spaced-apart slots therethrough, said slots having spaced-apart inner and outer walls, said inner wall being coplanar with an outer surface of said base wall and said outer wall being inclined away from said inner wall in an upward direction, said inner wall having a stop corner at its lower end; said cover member being of rectangular shape and capable of being snugly received in said recess and completely surrounded by said flange, said cover member having substantially the same depth as said recess and having a large central opening so that an advertising sheet in said recess is viewable through said central opening, a portion of said cover member corresponding to a bottom edge of said recess having a plurality of spaced-apart hinge tabs projecting downwardly into and through said slots, said hinge tabs being longer than said slots so that portions of said hinge tabs extend below bottoms of said slots, said hinge tabs having parallel front and rear surfaces which are receivable between and are opposed to said inner and outer walls of said slots, said cover member being movable to an inclined position relative to said base wall in which position said front surfaces of said tabs rest on and extend along said inclined outer walls of said slots and are vertically slidable therealong, and said rear surfaces of said tabs bear against and vertically slidably engage said stop corners; a portion of said flange defining a top edge of said recess having a rounded front edge and having a plurality of spaced-apart latching slots therethrough, a portion of said cover member corresponding to a top edge of said recess having a plurality of latching projections projecting upwardly into said latching slots, said latching projections being shorter than said latching slots so that said latching projections extend upwardly only partway through said latching slots, said latching projections having top surfaces which are inclined downwardly in the rearward direction and define cam surfaces, said cam surfaces engaging said rounded front edge of said flange as said cover member is moved toward said base wall so that said cover member and flange are resiliently deflected until said latching projections become aligned with said latching slots and resiliently snap thereinto.

2. In a shopping cart comprising a wheeled base having an upwardly opening basket mounted thereon wherein a sidewall of the basket has a base member of an advertisement display unit releasably fixedly secured thereto, said advertisement display unit also having a cover member releasably receivable in said base member, the improvement which comprises: said base member is comprised of a substantially planar base wall having a continuous flange extending at a right angle thereto, said flange defining the perimeter of a rectangular, shallow recess capable of receiving a removable advertising sheet, a portion of said flange defining a bottom edge of said recess having a plurality of spaced-apart slots therethrough, said slots having spaced-apart inner and outer walls, said inner wall being coplanar with a outer surface of said base wall and said outer wall being inclined away from said inner wall in an upward direction, said inner wall having a stop corner at its lower end; said cover member being of rectangular shape and capable of being snugly received in said recess and completely surrounded by said flange, said cover member having substantially the same depth as said recess and having a large central opening so that an advertising sheet in said recess is viewable through said central opening, a portion of said cover member corresponding to a bottom edge of said recess having a plurality of spaced-apart hinge tabs projecting downwardly into and through said slots, said hinge tabs being longer than said slots so that portions of said hinge tabs extend below bottoms of said slots, said hinge tabs having parallel front and rear surfaces which are receivable between and are opposed to said inner and outer walls of said slots, said cover member being movable to an inclined position relative to said base wall in which position said front surfaces of said tabs rest on and extend along said inclined outer walls of said slots and are vertically slidable therealong, and said rear surfaces of said tabs bear against and vertically slidably engage said stop corners; a portion of said flange defining a top edge of said recess having a rounded front edge and having a plurality of spaced-apart latching slots therethrough, the portion of said cover member corresponding to the top edge of said recess having a plurality of latching projections projecting upwardly into said latching slots, said latching projections being shorter than said latching slots so that said latching projections extend upwardly only partway through said latching slots, said latching projections having top surfaces which are inclined downwardly in the rearward direction and define cam surfaces, said cam surfaces engaging said rounded front edge of said flange as said cover member is moved toward said base wall so that said cover member and flange are resiliently deflected until said latching projections become aligned with said latching slots and resiliently snap thereinto.

3. An advertisement display unit for a shopping cart basket, including a generally vertically enlarged base member which is fixed to a sidewall of a basket, the base member including an enlarged base wall having a generally rectangularly-shaped ringlike boundary flange structure fixed thereto and projecting transversely thereof, said boundary flange structure cooperating with said base wall to define a shallow recess for accommodating a sheetlike advertisement therein, a rectangularly-shaped ringlike cover member positioned within said boundary flange structure in overlying relationship with said base wall to hold the sheetlike advertisement therebetween, and releasable latch means coacting between said base and cover members to normally but releasably hold said cover member in a closed position wherein it overlies said base wall for holding said advertisement therebetween, the improvement comprising separable hinge means coacting between said base member and said cover member for permitting hinging movement of said cover member between said closed position and an upwardly inclined opened position wherein said cover member upwardly angles outwardly from said base wall to permit insertion or removal of the advertisement, said hinge means including separable means for releasably holding said cover member in said outwardly angled position, said separable means maintaining said cover member coupled to said base member but permitting said cover member to be selectively entirely separated from said base member by movement of said cover member in its entirety in a direction outwardly away from said base wall, said separable hinge means comprising a pair of sidewardly spaced-apart through slots in said base member adjacent a bottom edge of said boundary flange structure, and a pair of sidewardly spaced-apart hinge tabs fixedly secured to and projecting outwardly in generally parallel and cantilevered relationship from a bottom wall of said cover member, said hinge tabs having a cantilevered length which is greater than the length of the slots so that each said hinge tab projects entirely through a respective said slot when the cover member is mounted on the base member, said hinge tabs and said slots having opposed walls which are normally spaced-apart when the cover means is in the closed position but which are engaged when the cover means is in the open position for limiting hinging movement of said cover member solely to movement between said opened and closed positions.

4. A display unit according to claim 3, wherein said slots open generally vertically downwardly through the bottom edge of said boundary flange structure, and wherein said hinge tabs are generally flat platelike elements which project downwardly in cantilevered relationship from the bottom wall of the cover member for projection downwardly through the slots.

5. A display unit according to claim 4, in which said releasable latch means comprises a plurality of sidewardly spaced-apart latching slots extending through said base member adjacent an upper wall of said boundary flange structure, and a plurality of latching projections projecting in generally parallel and cantilevered relationship from a top wall of said cover member for projection into the latching slots when the cover member is in the closed position, wherein the latching slots project vertically upwardly through the upper wall of said boundary flange structure, and wherein said latching projections project upwardly from the top wall of the cover member.

6. A display unit according to claim 3, wherein said slots project horizontally rearwardly through said base wall directly adjacent the bottom edge of said boundary flange structure, and wherein said hinge tabs are fixed to and cantilevered generally horizontally rearwardly from the bottom wall of said cover member with each said hinge tab being of a generally L-shaped configuration including an intermediate leg which projects horizontally rearwardly from the bottom wall through the respective said slot and which joins to a rear leg which projects vertically downwardly behind the base wall, said slot having a vertical height which is slightly greater than the vertical height of the respective said rear leg to permit said rear leg to move horizontally through the respective said slot when the cover member is mounted on the base member.

7. A display unit according to claim 6, in which said releasable latch means comprises a plurality of sidewardly spaced-apart latching slots extending through said base member adjacent an upper wall of said boundary flange structure, and a plurality of latching projections projecting in generally parallel and cantilevered relationship from a top wall of said cover member, each said latching projection projecting into a respective said latching slot when the cover member is in the closed position, wherein the latching slots project horizontally through the base wall directly adjacent an upper wall of said boundary flange structure, and wherein the latching projections are fixed to and cantilevered horizontally rearwardly from the top wall of the cover member with each said latching projection being of a generally cantilevered L-shaped configuration having an intermediate leg part which projects horizontally rearwardly from the top wall for extension through the respective latching slot and joined to a rear leg part which projects vertically upwardly for deposition behind a rear surface of the base wall, and said latching slot having a vertical height which slightly exceeds the vertical height of the respective rear leg for permitting the latching projection to be moved horizontally through the respective latching slot when the cover member is moved into or away from the closed position.

8. A display unit according to claim 3, in which said releasable latch means comprises a plurality of sidewardly spaced-apart latching slots extending through said base member adjacent an upper wall of said boundary flange structure, and a plurality of latching projections projecting in generally parallel and cantilevered relationship from a top wall of said cover member, each said latching projection projecting into a respective said latching slot when the cover member is in the closed position.

9. A display unit according to claim 8, wherein the latching slots project vertically upwardly through an upper wall of said boundary flange structure, and wherein said latching projections project upwardly from the top wall of the cover member.

10. A display unit according to claim 8, wherein the latching slots project horizontally through the base wall directly adjacent an upper wall of said boundary flange structure, and wherein the latching projections are fixed to and cantilevered horizontally rearwardly from the top wall of the cover member with each said latching projection being of a generally cantilevered L-shaped configuration having an intermediate leg part which projects horizontally rearwardly from the top wall for extension through the respective latching slot and joined to a rear leg part which projects vertically upwardly for deposition behind a rear surface of the base wall, and said latching slot having a vertical height which slightly exceeds the vertical height of the respective rear leg part for permitting the latching projection to be moved horizontally through the respective latching slot when the cover member is moved into or away from the closed position.

11. An advertisement display unit for a shopping cart basket including a base member which is fixed to a sidewall of a basket, the base member including an enlarged base wall having a generally rectangular-shaped ringlike boundary flange structure fixed to and projecting transversely thereof, said boundary flange structure cooperating with said base wall to define a shallow recess for accommodating a sheetlike advertisement therebetween, a rectangular-shaped ringlike cover member positioned within said boundary flange structure in overlying relation with said base wall to hold the sheet like advertisement therebetween, and releasable latch means coacting between said base and cover members to normally but releasably hold said cover member in a closed position wherein it overlies said base wall for holding said advertisement therebetween, the improvement comprising separable hinge means coacting between said base member and said cover member for permitting hinging movement of said cover member between said closed position and an upwardly inclined open position wherein said cover member angles outwardly and upwardly from said base wall to permit insertion or removal of the advertisement, said hinge means including separable means for releasably holding said cover member in said outwardly angled position, said separable means maintaining said cover member coupled to said base member but permitting said cover member to be selectively moved in its entirety substantially linearly transversely away from the base wall for permitting the cover member to be entirely separated from the base member, wherein said hinge means is formed by a pair of sidewardly-spaced hinge tabs which are fixedly secured to and project transversely from a bottom wall of said cover member in generally parallel and cantilevered relationship, and a pair of sidewardly-spaced tab-receiving slots formed through said base member adjacent a lower edge thereof, said tabs projecting through said slots for permitting swinging movement of said cover member between said open and closed positions while also permitting said tabs to be entirely withdrawn from said slots when said cover member is in said open position to permit total separation of said cover member from said base member.

12. A display unit according to claim 11, wherein said boundary flange structure includes a horizontally elongate bottom flange, said slots being formed in and extending through said base member at locations which are closely adjacent said bottom flange and are spaced horizontally therealong, and wherein said cover member includes a horizontally elongate bottom element which is positioned directly over said bottom flange, said tabs being fixed to said elongate bottom element in horizontally spaced relationship therealong with said tabs projecting transversely in cantilevered relationship from said elongate bottom element relative to the horizontally elongate direction thereof, said tabs projecting through said slots so as to be both slidable and angularly tiltable relative to the slots.

13. A display unit according to claim 11, wherein said slots are formed in and extend vertically through a horizontally elongate bottom flange of said boundary flange structure, and wherein said tabs are fixed to and project downwardly in cantilevered relation from a bottom element of said cover member so as to vertically slidably project through said slots.

14. A display unit according to claim 11, wherein said slots are formed in and extend horizontally through the base wall directly adjacent a horizontally elongate bottom flange of said boundary flange structure, and wherein the tabs are fixed to and project rearwardly in cantilevered relation from a bottom element of said cover member so as to horizontally slidably project through said slots.

15. A display unit according to claim 11, wherein said base member is molded in one piece of plastic material, and wherein said cover member including said tabs is molded in one piece of plastic material, said cover and base members being totally separate members which are free of permanent connection therebetween.

16. A display unit according to claim 11, wherein said tabs have a cantilevered length greater than the length of said slots so that the hinge tabs extend through and beyond outer ends of said slots.

17. A display unit according to claim 16, wherein each said tab cooperates with and contacts a rear outer edge of a respective said slot for supporting said cover member in angled relation relative to said base wall when said cover member is in said open position.

* * * * *